United States Patent
Delame et al.

(10) Patent No.: US 11,502,769 B2
(45) Date of Patent: Nov. 15, 2022

(54) METHOD FOR MANAGING DATA IN A TRANSPORTATION CABIN AND STANDARDISED IMPLEMENTATION ARCHITECTURE

(71) Applicant: LATELEC, Labege (FR)

(72) Inventors: Cyrille Delame, Toutens (FR); Serge Berenger, Paris (FR); Yoann Rebiere, Ramonville (FR)

(73) Assignee: LATELEC, Labege (FR)

( * ) Notice: Subject to any disclaimer, the term of this patent is extended or adjusted under 35 U.S.C. 154(b) by 143 days.

(21) Appl. No.: 16/646,338

(22) PCT Filed: Sep. 12, 2018

(86) PCT No.: PCT/EP2018/074637
§ 371 (c)(1),
(2) Date: Mar. 11, 2020

(87) PCT Pub. No.: WO2019/053075
PCT Pub. Date: Mar. 21, 2019

(65) Prior Publication Data
US 2020/0274632 A1    Aug. 27, 2020

(30) Foreign Application Priority Data

Sep. 13, 2017   (FR) ...................................... 1758477

(51) Int. Cl.
*H04J 14/02*        (2006.01)
*H04B 10/25*        (2013.01)
(Continued)

(52) U.S. Cl.
CPC ............ *H04J 14/021* (2013.01); *H04B 10/25* (2013.01); *H04B 10/40* (2013.01); *H04J 14/028* (2013.01);
(Continued)

(58) Field of Classification Search
None
See application file for complete search history.

(56) References Cited

U.S. PATENT DOCUMENTS 5,898,801 A     4/1999   Braun
9,794,019 B2 *  10/2017  Binkert ............... H04J 14/0256
(Continued)

FOREIGN PATENT DOCUMENTS

WO    WO2009/060153    5/2009
WO    WO2009/100352    8/2009
(Continued)

OTHER PUBLICATIONS

Glick et al., "Dynamically Reconfigurable Optical Links for High-Bandwidth Data Center Networks", 2009, OSA/OFC/NFOEC 2009, 3 pages (Year: 2009).*

(Continued)

*Primary Examiner* — David W Lambert
(74) *Attorney, Agent, or Firm* — Defillo & Associates, Inc; Evelyn A. Defillo

(57) ABSTRACT

A data management structure (1a) on board a transportation device, incorporating a cabin (100) provided with seats (110), includes a data resource block (210) incorporating audiovisual transmission system units (211 to 213), outward communication systems (100) and/or cabin systems, a standardised data distribution architecture (10a), and devices (E1 to E4) for operating said systems. In the structure (1a), the standardised architecture (10a) includes a concentration box (11) for the bidirectional transfer, on the one hand, of base signals with the resource block (210) and, on the other hand, optical signals with the devices (E1 to E4) of the cabin (100) on at least one optical fibre (2, 3; 2a, 2'a; 2b). This concentration box (11) houses units for processing (211 to 213) by signal switching, bidirectional conversion into optical signals, and optical signal management by wavelength allocation and distribution of downstream (F1) and upstream (F2) optical flows. This concentration box (11) is connected to the devices (E1 to E4) of said systems via intermediate boxes (30, 40) also housing processing units (111 to 113) according to the devices (E1 to E4) to which they are connected.

29 Claims, 6 Drawing Sheets

Figure 1:
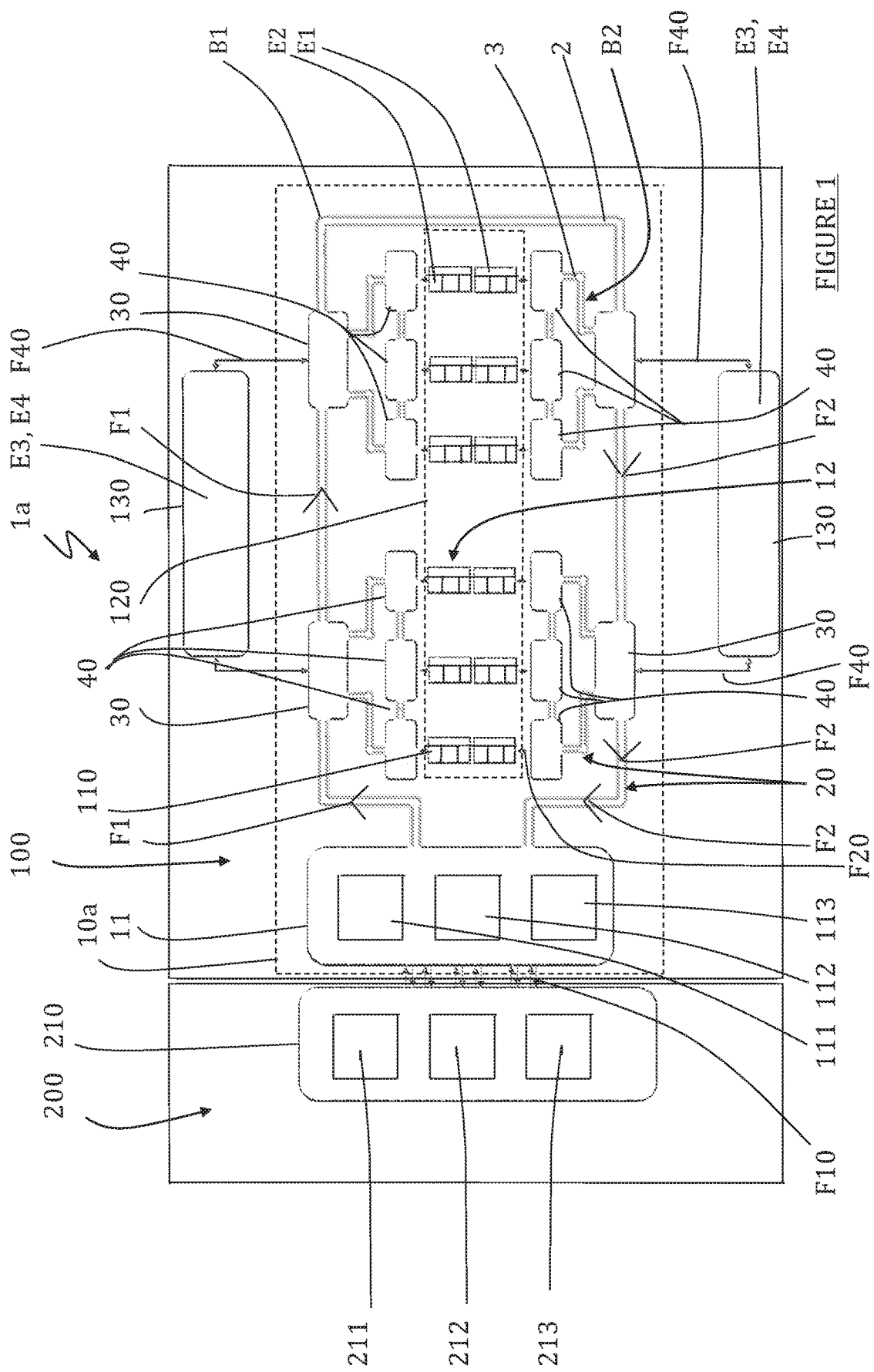

(51) Int. Cl.
  *H04B 10/40* (2013.01)
  *H04J 14/08* (2006.01)
  *H04Q 11/00* (2006.01)

(52) U.S. Cl.
  CPC .......... *H04J 14/08* (2013.01); *H04Q 11/0005* (2013.01); *H04Q 2011/0016* (2013.01)

(56) References Cited

U.S. PATENT DOCUMENTS

| | | |
|---|---|---|
| 2005/0247820 A1 | 11/2005 | Feist et al. |
| 2005/0258676 A1 | 11/2005 | Mitchell et al. |
| 2010/0139948 A1 | 6/2010 | Smallhorn |
| 2012/0027408 A1* | 2/2012 | Atlas .................... H04J 14/022 398/58 |
| 2012/0141066 A1 | 6/2012 | Tournier |

FOREIGN PATENT DOCUMENTS

| | | | |
|---|---|---|---|
| WO | WO-2009100352 A1 * | 8/2009 | .......... H04J 14/0282 |
| WO | WO2017/129255 | 8/2017 | |

OTHER PUBLICATIONS

Golmie N et al.: "A differenttiated optical service model for WDM network", IEEE Communication Magazine, IEEE Service Center, Piscataway, US, vol. 38, No. 2, Feb. 1, 2000, pp. 68-73.

Jukan A et al.: "Resource allocation strategies with QoS-routing in optical networks", Communications, 199, ICC '99. 1999 IEE International Conference on Vancouver, BC, Canada, Jun. 6-10, 1999, Piscataway, NJ, US, IEEE, US, pp. 2048-2054.

* cited by examiner

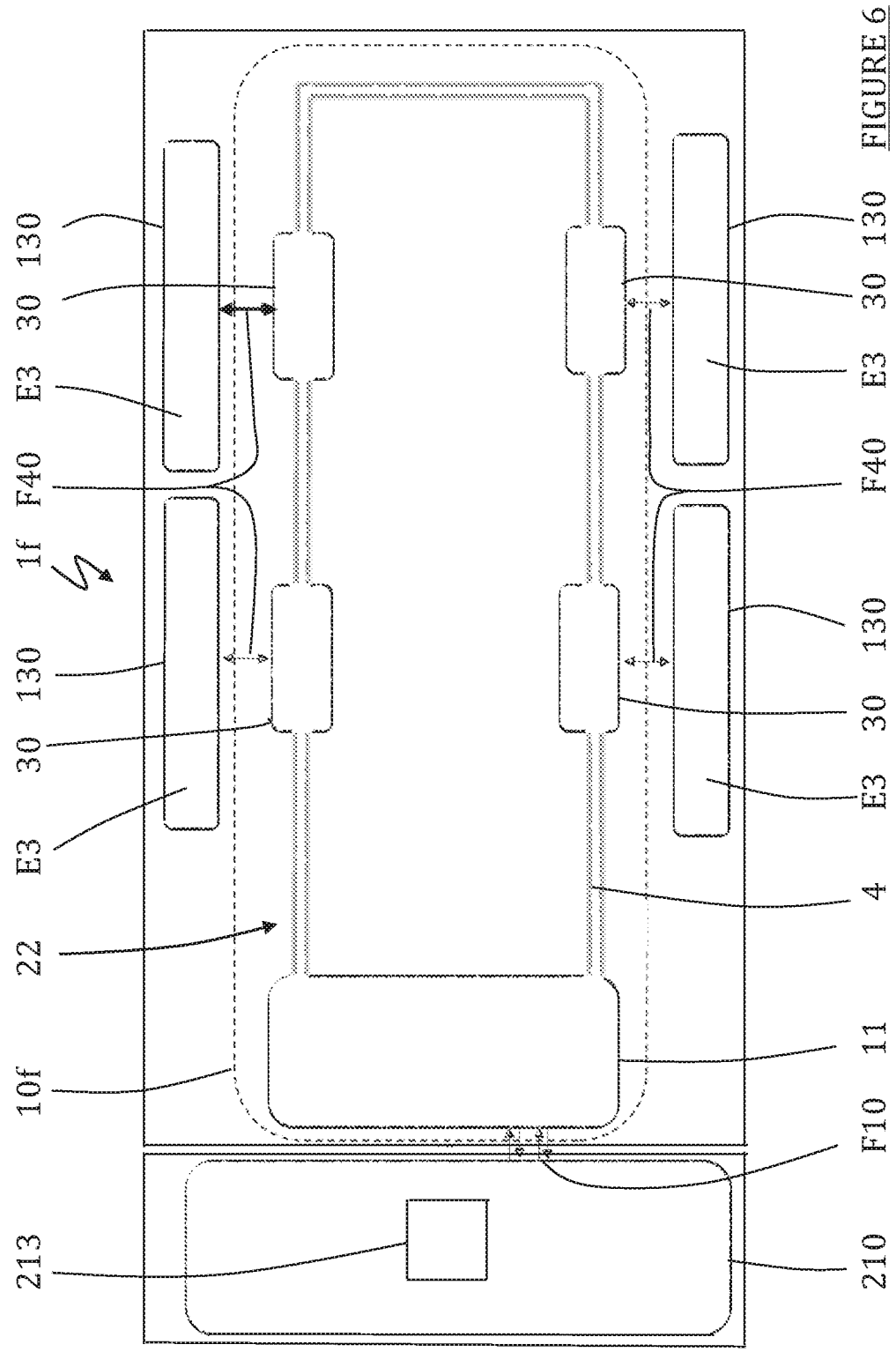

METHOD FOR MANAGING DATA IN A TRANSPORTATION CABIN AND STANDARDISED IMPLEMENTATION ARCHITECTURE

CROSS REFERENCE TO RELATED APPLICATION

This application is a national stage entry of PCT/EP2018/074637 filed Sep. 12, 2018, under the International Convention claiming priority over French Patent Application No. FR1758477 filed Sep. 13, 2017.

TECHNICAL FIELD

The invention pertains to a method for managing data in a passenger transport cabin, in particular in a passenger cabin of an aircraft, as well as to a data management structure incorporating a standardized optical-network architecture able to implement this method.

The architecture is termed "standardized" since it makes it possible to increase the modularity of the cabin, or of other transport structures, thereby facilitating its reconfiguration in successive cabin refits, while preserving this architecture which then remains a standard for the transmission of data. The invention applies in particular to the cabins of commercial passenger transport airplanes for civil aeronautics and to aircraft equipped with such an architecture for implementing this method.

The field of the invention pertains to the management of the transmission of data by a network to devices of a passenger cabin, whether technical devices for control and/or command of transport-critical cabin systems (pumps of an aircraft's air pressurization system, compressors of air conditioning systems, common lighting, detectors, actuators, etc.) or technical devices of non-critical cabin systems, in particular for flight in the case of an aerial transport (kitchens or "galleys" in the conventional terminology, ventilation, individual lighting, etc.), or else systems for outward communication (Internet, WIFI, LIFI, etc.) for personal electronic devices or PEDs, audiovisual systems (systems for transmitting pictures and/or sounds for the passengers, originating for example from the outside environment from cameras or from recordings, in particular the IFE entertainment system for aircraft, the acronym standing for "In Flight Entertainment" in the conventional terminology, etc.), or technical devices of the cabin.

The invention applies in particular to the passenger cabins of aircraft but also to the data networks embedded on board any type of transport vehicle, whether automotive vehicles, maritime transport, railroad transport or the like.

PRIOR ART

The current trend in transport is evolving toward embedding a growing number of electronic systems for managing data dedicated as much to the technical devices of the transport as to the personal devices of the passengers. In particular in aerial transport, the need of the passengers to remain connected (Internet, Video on Demand, telephone contact, etc.) is ever more pressing. Moreover, the isolation of the passengers in space contributes to increasing this need.

This data management is today ensured case-by-case through the proliferation of local direct links between the devices supplying data and the systems for utilizing these data. However, the proliferation of the links limits the quantity of personal electronic devices that can be used continuously by passengers whilst the number and diversification of PEDs (smartphones, tablets, cameras, laptop computers, virtual reality headsets, etc.) are increasing considerably.

Another consequence of the proliferation of these links is the appreciable increase in the weight and complexity of the onboard wiring. This consequence is aggravated by the fact that, since aircraft are using more and more base structures (fuselage, etc.) made of composite materials, heavy metallic devices are necessary in order to neutralize the effects related to lightning and to so-called EMI electromagnetic interference.

Thus, the massive use of wiring and the growing needs in terms of onboard bitrate, in particular for aircraft passenger cabins, require the setting up of lightweight, high-performance communication technologies that are insensitive to interference of EMI type.

Prior art documents report the use of optical fibers in an airplane cabin in order to transmit data. It is for example possible to cite the patent documents US 20100139948, US 2005247820, US 2005258676 and US 2012141066. However, the solutions developed in these documents describe optimized means dedicated to the installation of electrical cables or, likewise, of optical fibers in the passenger cabin of an aircraft. No overall architecture for managing and distributing data by optical pathway is described in these documents.

Moreover, the prior art solutions do not provide for a standardized architecture, capable of accommodating passenger cabin refits, in particular a standardized architecture compatible with ever more complex security norms, thereby giving rise in general to the design and realization of novel architectures at each cabin reconfiguration with significant maintenance times and immobilization cycles.

DISCLOSURE OF THE INVENTION

The invention is aimed, on the contrary, at allowing lightweight, high-performance communication of data which is insensitive to interference of EMI type and is able to accommodate cabin refits. Accordingly, the invention provides for bidirectional distribution of data that is built around transmission between data suppliers and devices utilizing and/or supplying data, via optical distribution of the data which is relayed to these devices as a function of parameterizable priorities.

More precisely, the subject of the present invention is a method for managing data in a passenger cabin equipped with a standardized architecture for distributing data streams between data resources of a "systems" part comprising an audiovisual transmission system, systems for outward communication from the cabin and/or cabin systems, and a part for "utilization" of these data consisting of recipient cabin devices via a conversion of data into optical signals. This management method consists in transmitting, in a so-called downgoing direction, the data supplied by at least one system of the systems part to a single concentration and configuration interface which steers the data of the resources according to the recipient device, converts the non-optical data into optical signals, and then allocates wavelengths to the optical signals and distributes them by multiplexing and parametrization of priorities as a function of the recipient devices and/or resources as a function of the resource and of the devices for a given resource, so as to transmit these multiplexed streams of optical signals on a pathway of at least one optical distribution network to the recipient devices of the utilization part via an intermediate interface which manages the wavelengths of the optical signals and reconverts them into signals suited to the devices if relevant. The transmission of data is also undertaken in the reverse so-called upgoing direction according to a processing reversed at each interface from devices of the cabin to the resources concerned via the intermediate interface as a function of the resource concerned, the optical distribution network and then the concentration and configuration interface which transmits them to the resource concerned.

Under these conditions, the use of an optical distribution network makes it possible to build a lightweight, simplified, durable and standardized high-performance architecture which is independent of the functions and protocols between the system part and the utilization part. It furthermore makes it possible to circumvent the large amount of interconnection wiring installed along the whole cabin, and therefore to achieve a significant time saving during refits, and to improve security (computer security of the exchanges of data on fiber, insensitivity to interference of EMI type, etc.).

Moreover, this method uses a number of optical networks that is suited to the implementation conditions (physical constraints, functional requirements, performance and bitrates envisaged, choices of cabin design, etc.) by applying a number of optical networks which is optimized for a given number of categories of system from among audiovisual systems, communication systems and cabin systems: one network for one category of systems, one or two networks for two categories, and one, two or three networks for three categories of systems.

The allocation of wavelengths and the distribution of the optical signals can also be undertaken as a function of the class level, premium or standard (that is to say according to the level of service, of device and of provision), of the optical streams for the resources and devices for audiovisual transmission of IFE type, and for communication (PED, etc.), as well as by discrimination between the critical or non-critical streams of the resources and technical devices of the cabin systems.

According to particular modes, the method can provide that:
  the intermediate interface is connected to the devices of the cabin systems and/or to the devices of the communication systems;
  the intermediate interface comprises at least one disconnection interface coupled to linking interfaces for linking to the devices of the audiovisual system and to the devices of the systems for outward communication situated in proximity to the devices of the audiovisual system, the linking interfaces ensuring, in both directions, optical/electrical conversion as well as management by allocation of wavelengths and distribution of data;
  the allocation of the wavelengths is performed as a function of the positioning of the devices in the cabin, of the physical constraints of the cabin and of the functional service characteristics related to a type of optical stream pertaining to a level of class and/or of security, for example the premium or standard level of the optical streams or the discrimination between the critical or non-critical streams of the resources and technical devices of the cabin systems;
  the architecture is reconfigured by a digital processing applied to the concentration and configuration interface during installation and/or removal of the audiovisual devices, communication devices, and/or devices for technical command/control of the cabin;
  a redundancy architecture incorporating at least the concentration and configuration interface is deployed according to a configuration identical to the concentration and configuration interface of the standardized architecture, so as to circumvent the physical deterioration constraints and to forewarn of possible faults within the optical distribution network; as an option, the redundancy architecture also incorporates an intermediate interface for connection to the devices;
  the optical distribution network can add and/or separate optical streams by multiplexing and/or demultiplexing of wavelengths within this network;
  the transmission of data is performed in the downgoing and upgoing directions either on the same optical pathway or on two distinct optical pathways.

The invention also pertains to a data management structure embedded on board a transport means incorporating a cabin equipped with passenger seats, said structure comprising a data resources block incorporating central units of systems comprising an audiovisual transmission system, systems for outward communication from the cabin and/or cabin systems, a standardized architecture for distributing data streams in the cabin, and cabin devices for utilization of said systems. In this structure, the standardized architecture comprises a concentration and configuration box for bidirectional transfer, on the one hand, of base signals with the data resources block and, on the other hand, of optical signals with the devices of the cabin on at least one optical network fiber. This concentration and configuration box incorporates units for processing by switching of the base signals, bidirectional conversion of the base signals into optical signals for transfer to the devices, and management of these optical signals by allocation of wavelengths and distribution of downgoing and upgoing optical streams. This concentration and configuration box is linked to the devices of said systems via intermediate boxes also incorporating at least some of the processing units as a function of the devices to which they are linked.

According to preferred embodiments:
  the base signals between the concentration and configuration box and the data resources block are chosen from between electrical, RF and optical signals;
  the intermediate boxes consist of at least one disconnection box incorporating units for converting optical/electrical signals, and/or for switching and/or for management by allocation of wavelengths as a function of the devices of communication systems and/or cabin systems in conjunction;
  each disconnection box is linked to the devices of the audiovisual transmission systems and to devices of the communication systems in proximity to the passenger seats via interface boxes furnished with units for optical/electrical conversion and for management of allocation of wavelengths;
  the base signals being electrical signals, the intermediate boxes consist of interface boxes incorporating units for electrical/optical conversion and for management by allocation of wavelengths, each interface box being linked to devices of the audiovisual transmission systems and communication systems in proximity to the passenger seats;
  the seats are hooked up to the corresponding interface box by signals emitters/receivers;
  the interface boxes are linked to one another and to a disconnection box according to a configuration chosen from between a chain configuration, bus configuration, ring configuration and star configuration, as a function of the physical constraints, of the functional requirements and of the design choices;

the distributing of the signals by the disconnection box to the interface boxes is carried out by a technique chosen from between copyovers by successive transfer in the case of a chain configuration and selective transmissions by optical separators in the case of a star configuration;

each interface box transmits electrical signals to several passenger seats and comprises a unit for converting the downgoing signals to the devices into electrical signals and the upgoing signals from the devices into optical signals, and a unit for management by allocation of wavelengths incorporating an OADM multiplexer for injecting and recovering optical signals respectively into and from at least one optical fiber;

the unit for management by allocation of wavelengths of each interface box incorporates a so-called ROADM reconfigurable OADM multiplexer for injecting and extracting optical signals;

the wavelength allocations can be parametrized according to a distribution that can be chosen by type of system, by association with each disconnection box, by association with the interface boxes linked to one and the same disconnection box, by location of the devices as a function of their class, and/or by type of downgoing and upgoing stream between the interface boxes and the concentration and configuration box;

the allotting of the wavelength allocations is identical in the upgoing and downgoing directions of the data streams between the interface boxes and the concentration and configuration box;

the intermediate boxes consist of at least one disconnection box incorporating units for switching and for managing allocation of the wavelengths as a function of the devices of the audiovisual systems, communication systems and/or cabin systems in conjunction, each disconnection box being coupled directly to the devices of cabin systems and to devices of communication systems situated in the cabin, and coupled to the devices of the audiovisual transmission systems and to devices of the communication systems in proximity to the passenger seats via interface boxes furnished with units for optical/electrical conversion and for management by allocation of wavelengths;

in the case where the allocation of the wavelengths is independent of the interface boxes, means for controlling access to these boxes are provided and chosen from among time division multiplexing or TDM, token passing and synchronous sampling of polling type, so as to avoid the risks of interference;

each switching unit comprises resources data steering contactors ("switches" in the conventional terminology) activated by the concentration and configuration box as a function of the recipient devices;

each switching unit incorporates means for managing priorities;

each electrical/optical conversion unit incorporates electro-optical emitters-receivers ("transceivers" in the conventional terminology), these transceivers being able to be coupled to specific adaptors of data as a function of the resources;

each unit for management by allocation of wavelengths and distribution of the downgoing and upgoing optical streams comprises a network for allotting by multiplexing chosen from between a wavelength division multiplexer (or WDM), a dense division multiplexer (or DWDM, the acronym standing for "dense wavelength division multiplexer"), a coarse division multiplexer (or CWDM, the acronym standing for "coarse wavelength division multiplexer") and an ultra-dense division multiplexer (or UDWDM, the acronym standing for "ultra-dense wavelength division multiplexer");

each unit for management by allocation of wavelengths and distribution of the upgoing and downgoing optical streams also incorporates means for specific management of the optical signals coupled to the wavelength division multiplexer and chosen from among a terminal multiplexer of wavelengths of the optical signals or OTM, an optical wavelength demultiplexer of the signals arising from the optical network or OWD, a multiplexer for injecting optical signals at a wavelength and for extracting optical signals on corresponding-device reception wavelengths or OADM, and/or an optical connector of wavelengths to specific ports or OXC (OTM, OWD, OADM and OXC being respectively acronyms standing for "optical terminal multiplexer", "optical wavelength demultiplexer", "optical add and drop multiplexer" and "optical cross connect" in the conventional terminology);

the downgoing and upgoing optical streams are either carried jointly on at least one optical fiber or separated on at least two optical fibers, for reasons of redundancy, of further deployment, of bitrate or of performance, the optical fibers being able to be single-mode and/or multimode;

the transport structure is an aircraft and the data resources are situated in the aircraft in proximity to the passenger cabin, in particular in an avionics bay.

PRESENTATION OF THE FIGURES

Figure 2:
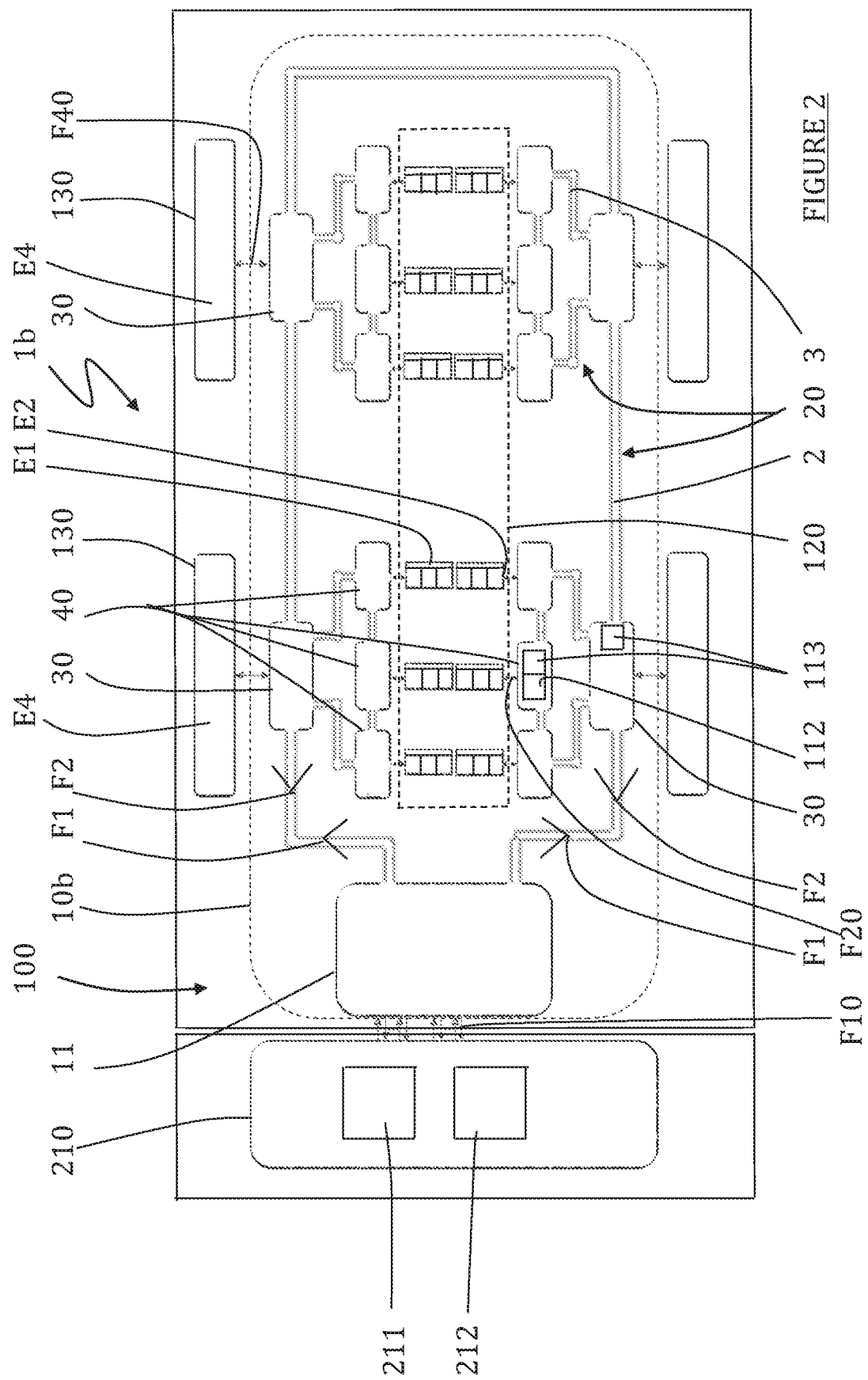
Figure 3:
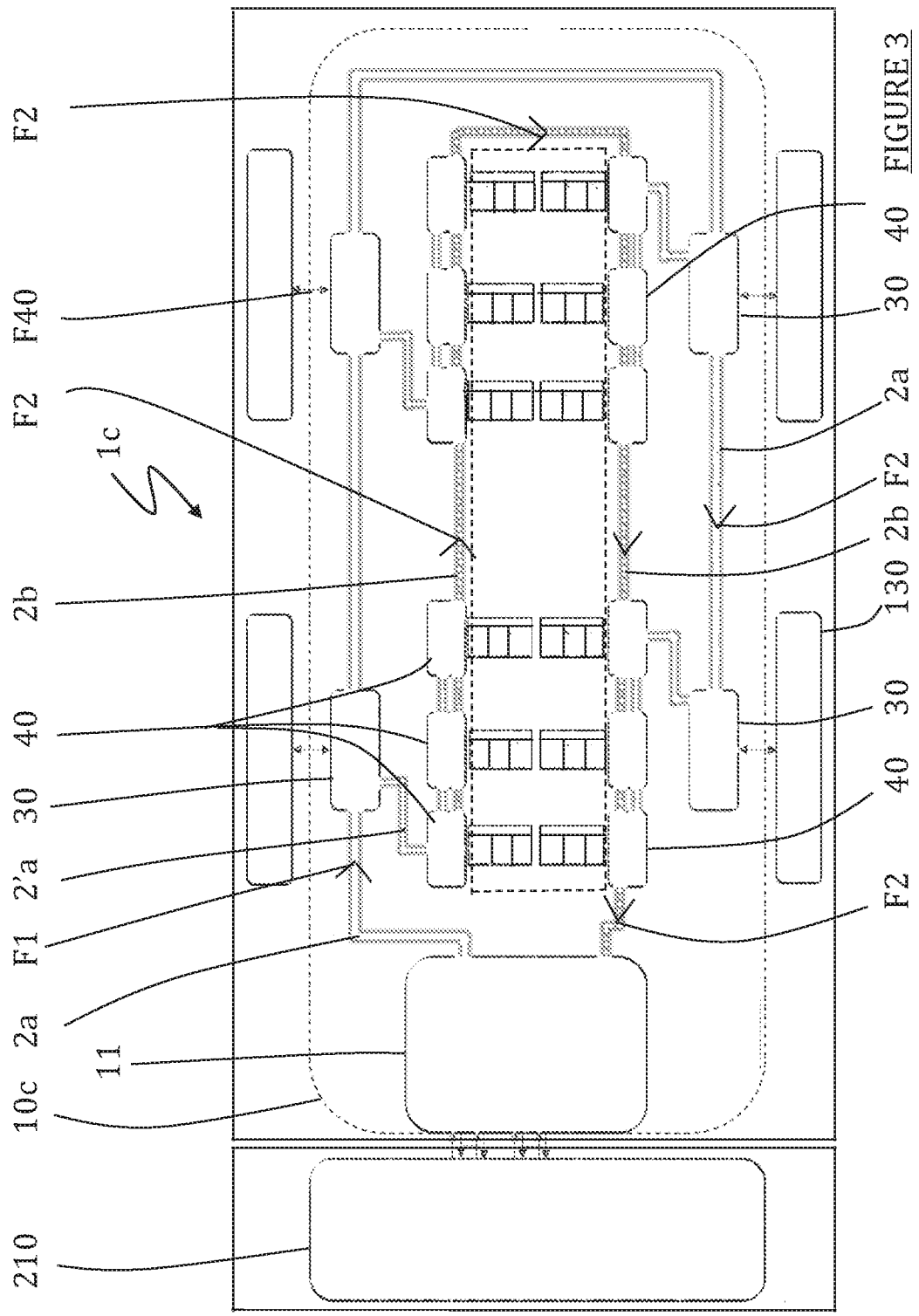
Figure 4:
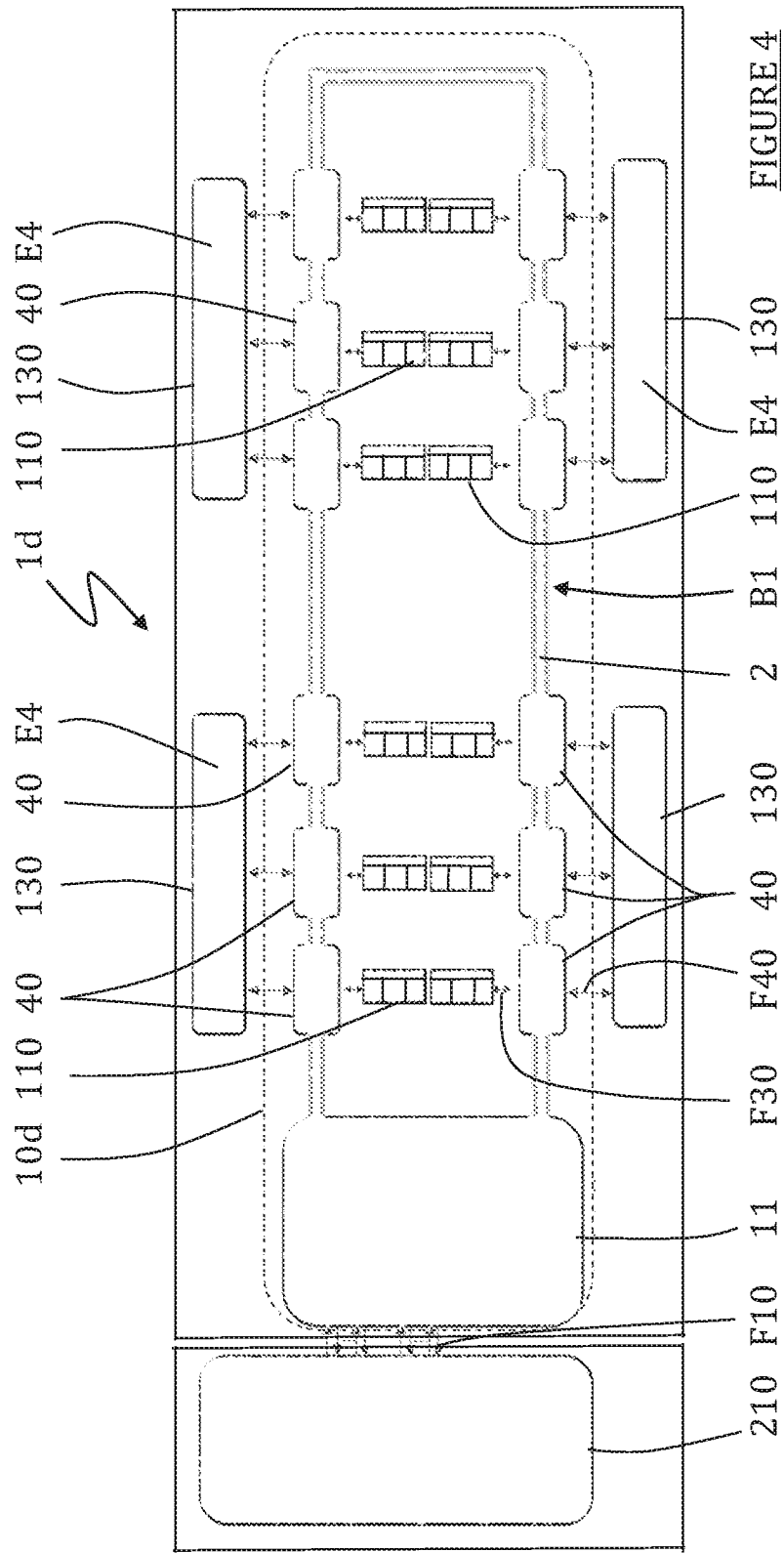
Figure 5:
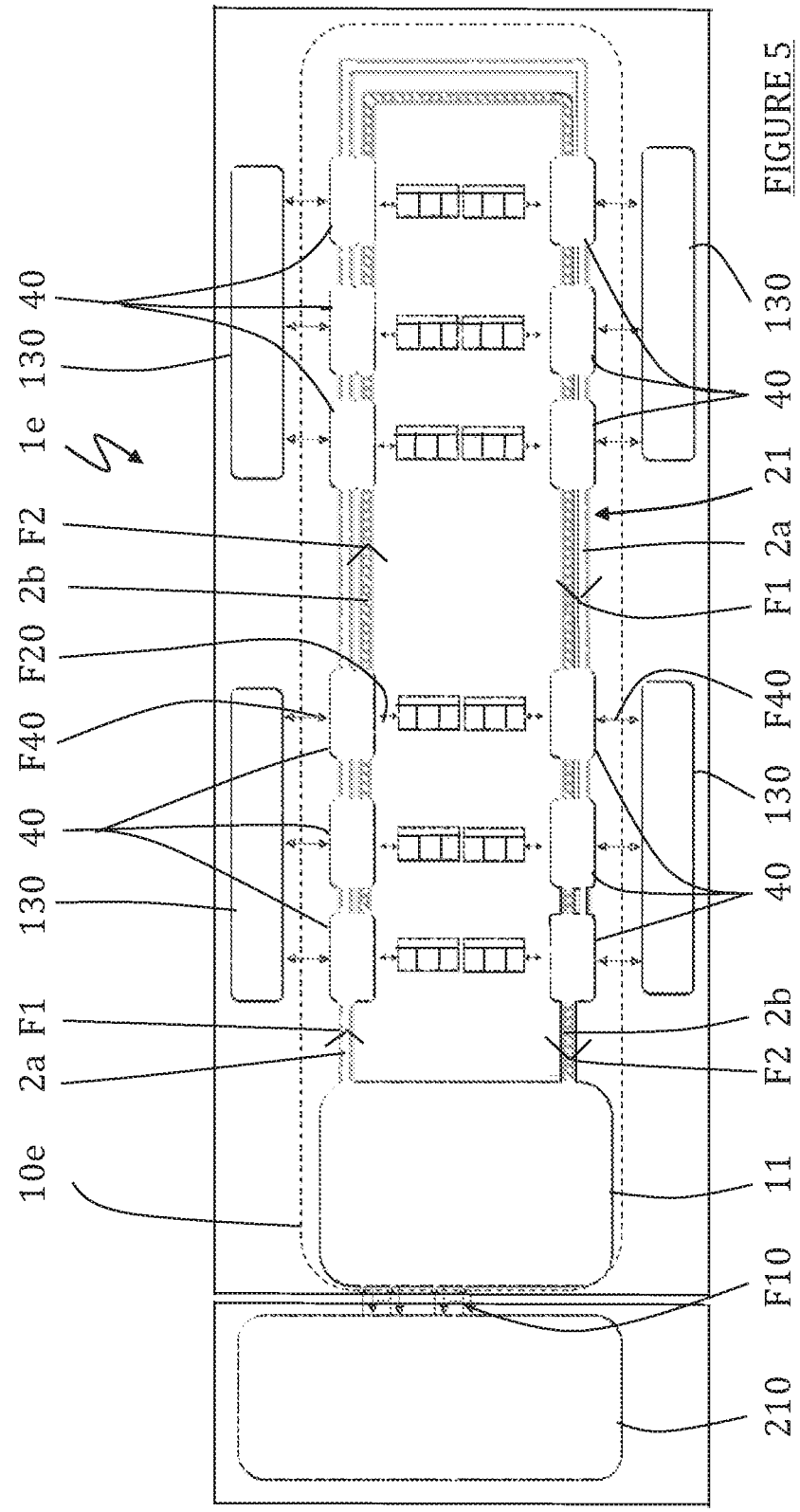

Other data, characteristics and advantages of the present invention will become apparent on reading the non-limited description which follows, with reference to the appended figures which represent, respectively:

FIG. 1, a block diagram of an exemplary data management structure embedded in a passenger cabin of an aircraft for devices of an IFE system, of communication systems and of cabin systems;

FIG. 2, a block diagram reusing the exemplary structure of FIG. 1 dedicated to the devices of an IFE system and to communication systems;

FIG. 3, a variant of the block diagram of FIG. 2 with separation of the downgoing and upgoing optical streams on two optical fibers;

FIG. 4, a variant of the block diagram of FIG. 2 without disconnection box, allows an adaptation as a function of the needs of each seat in terms of bitrate and bandwidth;

FIG. 5, a variant of the block diagram of FIG. 4 with separation of the upgoing and downgoing streams on two optical fibers, and FIG. 6, a variant of the block diagram of FIG. 1 without interface box and dedicated to the technical devices of the cabin systems.

In the description hereinbelow, identical reference signs pertain to one and the same element or a similar element having the same function and refer to the passage(s) of the text which describes(describe) it(them).

DETAILED DESCRIPTION OF EMBODIMENTS

The block diagram of FIG. 1 illustrates an exemplary data management structure 1a embedded in an aircraft incorporating a passenger cabin 100, equipped with seats 110 in the passenger area 120, and an avionics bay 200. The structure 1a comprises a data resources block 210 in the avionics bay 200 incorporating three central units 211 to 213: a central unit 211 of an IFE transmission system, a central unit 212 of systems for communication (Internet and WIFI in the example) between the cabin 100 and outside of the cabin, and a central unit 213 of the cabin systems in conjunction with the flight-critical or non-flight-critical technical devices.

The structure 1a also comprises a standardized architecture 10a for distributing downgoing streams F1 and upgoing streams of data in and from the devices of the cabin 100. The downgoing streams F1 make it possible to utilize the data originating from said central units 211 to 213 and the upgoing streams F2 to transfer data to said central units 211 to 213 from the devices. These devices are dispersed in the cabin 100: the terminals E1 of the IFE system which are incorporated with the seats 110 of the passenger area 120, the PED devices E2 of the passengers positioned in proximity to these seats 110 the communications of the terminals E1 and of the PED E2 being managed respectively by the central units 211 and 212; and, outside of the passenger area 120, in the locations 130 in this exemplary embodiment, the critical and non-critical technical devices E3 (actuators of pumps, temperature or pressure detectors, decoding/encoding units, cooking appliances for the galleys, etc.) of the cabin systems managed by the central unit 213, as well as devices E4 of communication systems situated in the cabin 100 and managed by the central unit of the communication systems 212.

The distribution of downgoing data streams F1 is generated by a concentration and configuration box 11 of the standardized architecture 10a. According to bidirectional transfers, said box 11 communicates, on the one hand, electrical signals with the central units 211 to 213 of the resources block 210 (double arrows F10) and, on the other hand, optical signals with the devices of the cabin 100 via an optical fiber 2 forming a primary loop B1 of an optical network 20 on the concentration and configuration box 11. The optical network 20 is incorporated, according to various embodiments, in the ceiling and/or in the floor of the cabin 100.

Such a concentration and configuration box 11 incorporates processing units for the signals 111 to 113: a switching unit 111 for steering the electrical signals generated by the resources block 210 as a function of the devices E1 to E4, a unit for bidirectional conversion 112 of the switched electrical signals 210 into optical signals, and a management unit 113 for managing the optical signals through parameters for allocation into wavelengths and distribution into downgoing F1 and upgoing F2 optical streams in the network 20.

The switching is advantageously adjusted by switches (not represented) activated by the concentration and configuration box 11 which also manages the switches of all the switching units 111 described hereinafter. These switches allow optimal steering of the signals by multiplexing networks (as specified hereinafter) as a function of their destination characterized by a physical address or, in variants, by a logical address or a port number.

The concentration and configuration box 11 is linked to the devices E1 to E4 of the IFE systems, of the communication systems and of the cabin systems via intermediate boxes mounted in series, the disconnection boxes 30 of the optical network 20 in the example illustrated. The optical network 20 comprises secondary chain loops B2 with single optical fiber 3 which are coupled to the primary loop 20 through the disconnection boxes 30. In these secondary loops B2, the connection interface boxes 40 are coupled (double arrows F20) to the devices E1 and E2 of the cabin area 120.

The disconnection boxes 30 are thus coupled electrically to the devices E3, E4 of the cabin locations 130 via electrical wiring (double arrows F40), and to the devices E1, E2 of the passenger area 120 via the interface boxes 40.

Each disconnection box 30 is then linked to several three in the example interface boxes 40 mounted in series loopwise ("daisy chain" in the conventional terminology) on the disconnection box 30, and each interface box 40 is coupled electrically to a row of seats 12 or, as a variant embodiment, to several rows. Alternatively, as a function of the bulkiness constraints, of the functional requirements or of design choices, the interface boxes 40 can be connected as a bus, ring or star. The distributing of the signals by the disconnection box 30 to the interface boxes 40 is carried out by copyovers by successive transfer in the case of a chain configuration or selective transmissions by optical separators in the case of a star configuration.

Each of these disconnection boxes 30 incorporates a unit 111 for switching the electrical signals generated by the devices E3 and E4, a unit 112 for bidirectional conversion of the switched electrical signals into optical signals and a unit 113 for management of the optical signals by allocation into wavelengths and distribution into optical streams in the network 20.

Moreover, in this exemplary embodiment, each interface box 40 also incorporates a unit 112 for bidirectional conversion of the electrical signals into optical signals, and a unit 113 for management of the optical signals by allocation of wavelengths and distribution of optical streams in the network 20. In the case where the allocation of the wavelengths is allotted independently of the interface boxes 40, several interface boxes 40 can emit or receive signals on one and the same wavelength. To avoid such risks of interference, means for controlling access to these interfaces 40 are advantageously deployed. Such access control means are chosen from among time division multiplexing or TDM, token passing and synchronous sampling of polling type.

Advantageously, each switching unit 111 incorporates a protocol for managing priorities as a function of the various devices E1 to E4, for example by prioritizing the signals to be transmitted to the technical devices E3, and then to the devices of the communication systems E4 and E2, and finally to the devices E1 of the IFE system. Moreover, each electrical/optical bidirectional conversion unit 112 advantageously incorporates electro-optical emitters-receivers ("transceivers" in the conventional terminology) coupled to specific adaptors of data as a function of the type of data system of the resources block 210, namely in the present example the IFE system, the communication systems and the cabin systems.

Concerning the wavelength allocations, each unit 113 for management by allocation of wavelengths and distribution of downgoing optical streams F1 in the "concentration and configuration box 11 toward the devices E1 to E4" direction and upgoing optical streams F2, in the reverse direction, comprises a wavelength division multiplexer termed WDM. Alternatively, as a function of the performance, bitrate and addressing requirements and of physical constraints, a dense division multiplexer termed DWDM, a coarse division multiplexer termed CWDM or an ultra-dense division multiplexer termed UDWDM can advantageously be used.

Advantageously, each management unit 113 also incorporates a specific management multiplexer of the optical signals which is coupled to the wavelength division multiplexer, a terminal multiplexer of wavelengths of the optical signals termed OTM in the exemplary embodiment. Alternatively or in combination, an optical wavelength demultiplexer of the signals arising from the optical network 20, termed OWD, a multiplexer for injecting optical signals at a particular wavelength and for extracting optical signals on corresponding-device reception wavelengths, termed OADM, and/or an optical connector of wavelengths to specific ports, termed OXC, can be incorporated.

The distribution of the wavelengths is advantageously parametrized by type of service provided according to the systems (IFE system, communication systems and cabin systems). For the sake of simplification, the allotting of the wavelengths is identical in this example, in the upgoing F1 and downgoing F2 directions of the communication streams between the interface boxes 40 and the conversion and configuration box 11 but, to properly differentiate the upgoing and downgoing directions, the strategy of allocations may be different in these two_directions according to variant embodiments. In the example, wavelengths in the band 1270-1370 nm are allocated every 20 nm.

Alternatively, the allocation parameters can be chosen as a function of the disconnection boxes 30, of the interface boxes 40 linked to one and the same disconnection box 30, by location of the devices E1 to E4 as a function of their premium or standard class, and/or by type of downgoing F1 and upgoing F2 stream between the interface boxes 40 linked to one and the same disconnection box 30 and the conversion and configuration box 11.

The architecture 10a advantageously takes into account the critical or non-critical nature of the data transported on the optical network 20 between the concentration and configuration box 11 and the technical devices E3. Accordingly, the critical signals, intended for the technical devices E3 that are critical for the flight conditions, are carried by the avionics full duplex protocol termed AFDX, whilst the non-critical data intended for the non-critical technical devices E3 are processed by the Ethernet protocol.

The block diagram of FIG. 2 illustrates a simplified data management structure 1b which reuses the previous structure 1a without the devices E3 of the cabin systems which are managed by another distribution network, for example by the ceiling (cf. FIG. 6). The structure 1b then manages the devices E1 of the IFE system and the PED devices E2 of the passenger area 120, as well as the devices E4 of the communication systems in the cabin locations 130. In this case, the data arising from the two central units 211 and 212 of the resources block 210, respectively of the IFE system and of the communication systems, use only one and the same distribution network 20, through the floor of the cabin 100 in the exemplary embodiment.

This simplified management structure 1b incorporates an architecture 10b which reuses the standardized architecture 10a in which the disconnection boxes 30 are devoid of signals conversion unit since all the conversions are performed by the interface boxes 40 in this example. Alternatively, if the disconnection boxes 30 are equipped with conversion units 112, as in the management structure 1a (cf. FIG. 1), these conversion units are not incorporated or are rendered inactive. Each disconnection box 30 incorporates a management unit 113 equipped with an OADM, or ROADM multiplexer to increase the adaptability of the communication systems to the cabin refits.

The interface boxes 40 reuse the same configuration: an optical/electrical bidirectional conversion unit 112 and a management unit 113 equipped with an OADM multiplexer.

As a variant, in the case where each interface box 40 operates on its own wavelength, the data strictly addressed to its seats are recovered by a ROADM multiplexer with injection or DROP and addition or ADD functions: it can recover the data which are strictly addressed to its seats by effecting a DROP of the signal associated with its reception wavelength. It can also transmit the signals dispatched by its seats in the fiber by performing the ADD function of the signal associated with its emission wavelength. Depending on the design choices, the emission and reception wavelengths may be different.

Moreover, in the standardized architecture 10a, each fiber 2 or 3 of the optical network 20 carries the whole set of downgoing F1 and upgoing F2 data streams.

In the architecture 10c of the block diagram of FIG. 3, which illustrates a variant embodiment 1c of the simplified data management structure 1b, the downgoing F1 and upgoing F2 data streams are separated. In this architecture 10c, a downgoing streams fiber 2a, dedicated to the transport of the downgoing data streams F1, links the concentration and configuration box 11 to the disconnection boxes 30 and to the interface boxes 40, via bypass fiber prolongations 2'a, and an upgoing streams fiber 2b, dedicated to the transport of the upgoing data streams F2, links the interface boxes 40 to the concentration and configuration box 11.

In variants, several downgoing streams fibers and/or several upgoing streams fibers can be used as a function of the requirements of performance, of addressing or of physical constraints.

In the architecture 10d of the management structure 1d of the block diagram of FIG. 4, which reuses the simplified data management structure 1b of FIG. 2, the disconnection boxes 30 are removed so as to directly accommodate the needs of each seat 110 in terms of bitrate and bandwidth. In this architecture 10d, the interface boxes 40 are connected directly to the concentration and configuration box 11 via the optical fiber 2 forming the network loop B1. The communication devices E4 are then coupled by wiring to the interface boxes 40.

As illustrated by the architecture 10e of the management structure 1e of FIG. 5, it is also possible to separate the downgoing F1 and upgoing F2 data streams on the basis of the architecture 10d. In this architecture 10e, a downgoing streams fiber 2a, dedicated to the transport of the downgoing data streams F1, links the concentration and configuration box 11 in series to the successive interface boxes 40, and an upgoing streams fiber 2b, dedicated to the transport of the upgoing data streams F2, links the interface boxes 40 in series and successively to the concentration and configuration box 11. The fibers 2a and 2b form an optical network 21 with separated downgoing F1 and upgoing F2 streams.

An architecture 10f dedicated to the technical devices E3 of the cabin systems (locations 130) is illustrated by the block diagram of the management structure 1f of FIG. 6, in conjunction (double arrows F40) with the concentration and configuration box 11 of the management structure 1a (cf. FIG. 1). In this architecture 10f, the distributing of the data arising from the central unit of the cabin systems 213 takes place via a fiber 4 forming a looped optical network 22 through the ceiling of the cabin. The fiber 4 links the disconnection boxes 30 mounted in series and the devices E3 are coupled to these boxes 30 by emitter/receiver means. The two main families of data processed are the critical data and the non-critical data of the technical devices E3, respectively critical (actuators, detectors, decoding/encoding units, light units, display, announcements, etc.) and non-critical (galleys, lights, ventilation, etc.).

As a variant, it is possible to deploy several fibers 4 in parallel and the total number of fibers depends mainly on the addressing capacity—for example according to a wavelength division multiplexing or WDM of the concentration and configuration box 11—and on the proposed maximum bitrate. The critical data are for example supported by the AFDX protocol and the non-critical data by Ethernet, steered by AFDX and Ethernet contactors of said box 11. The CAN bus protocol is also used, for example for the detectors, by the box 11 at the level of the optical/electrical conversion unit 112 (cf. FIG. 1).

The management of the wavelengths and distribution of the streams is processed just as within the framework of the architecture 10*a*, for example by combination of the OTM, OWD, OADM and/or ROADM multiplexers.

With the management of critical data, a redundant distribution architecture having several fibers 4 is deployed so as to ensure the transfer of information in case of network fault.

The invention is not limited to the examples described and represented. The architectures are reconfigurable by a digital update applied to the concentration and configuration box and to the disconnection boxes.

Redundant architectures can be deployed according to a configuration identical to the initial distribution architecture, so as to circumvent the physical deterioration constraints and to forewarn of possible faults within the optical distribution network. In particular, in the case where critical devices of the cabin systems are utilized by these architectures, a redundant architecture is set up by twinning the optical networks.

The invention can use a variable number of optical networks which is suited to the conditions of implementation (physical constraints, functional requirements, performance and bitrates envisaged, choices of cabin design, etc.). Thus an optimized number of optical networks, without counting the redundant networks, can be applied for a given number of categories of systems, for example for the three categories described hereinabove (audiovisual systems, communication systems and cabin systems): one network for one category of systems; a common network or a network per category of systems for two given categories of systems, and a common network, two networks (a common network and a dedicated network) or three dedicated networks for three given categories of systems. But the invention can apply to a systems part consisting of more than three categories.

Moreover, the downgoing and upgoing optical streams are either carried jointly on at least one optical fiber or separated and conveyed on at least two optical fibers (for reasons of redundancy, of further deployment, of bitrate or of performance, etc.). Moreover, the optical fibers can be single-mode and/or multimode, depending on the desired performance.

Furthermore, the central units of the IFE, of the communication systems and of the cabin systems are connected to one and the same optical distribution network as is illustrated by the architecture 10*a* of FIG. 1, or are connected to various optical networks, as is illustrated for example by the architectures 10*c* to 10*f* illustrated respectively in FIGS. 3 to 6.

Moreover, the base signals between the concentration and configuration box and the data resources block can be non-electrical signals, for example directly optical signals, thereby making it possible to circumvent the electrical/optical converters, signals transmitted by RF pathway between ad hoc emitters and receivers, or any type of signal convertible into an analog signal.

Moreover, in case a fiber is cut, it is possible to operate the system in a partial manner by feeding via the uncut circuit, either in the upgoing direction or in the downgoing direction.

The invention claimed is:

1. A method for managing data in a passenger cabin (100) equipped with a standardized architecture (10*a* to 10*f*) for distributing data streams (F1, F2) between data resources (211 to 213) of a systems part comprising an audiovisual transmission system, systems for outward communication from the cabin (100) and/or cabin systems, and cabin recipient devices (E1 to E4) via a conversion of data into optical signals, the method comprising the steps of:

transmitting in a downgoing direction, a data supplied by at least one of the systems of the systems part to a single concentration and a configuration box (11) which: steers the data resources (211 to 213) according to the cabin recipient device (E1 to E4); converts a non-optical data into optical signals; allocates wavelengths to the optical signals; and then distributes the wavelengths by multiplexing and parametrization of priorities as a function of the cabin recipient devices (E1 to E4) and/or the data resources (211 to 213);

transmitting multiplexed streams (F1) of optical signals on a pathway (2; 2*a*, 2'*a*; 2*b*) of at least one optical distribution network (20 to 22) to the cabin recipient devices (E1 to E4) via an intermediate interface (30, 40) which manages the wavelengths;

reconverting the wavelengths into signals suited to the cabin recipient devices (E1 to E4);

transmitting the data in an upgoing direction at each interface (30, 40) from the cabin recipient devices (E1 to E4) to the data resources (210; 211 to 213) via the intermediate interface (30, 40);

wherein cabin recipient devices (E1 to E4) include an audiovisual system (E1), a communication for personal electronic devices system (E2), a non-critical technical communication device system (E3), and a technical command/control communication system (E4).

2. The management method as claimed in claim 1, wherein the intermediate interface (30, 40) is connected to the cabin recipient devices (E3, E4) of the cabin systems and/or to the communication for personal electronic devices system (E2).

3. The management method as claimed in claim 1, wherein the intermediate interface (30, 40) comprises at least one disconnection interface (30) coupled to linking interfaces (40) for linking to the devices of the audiovisual system (E1) and to the communication for personal electronic devices system (E2) situated in proximity to the devices of the audiovisual system (E1), the linking interfaces (40) ensuring, in both directions, optical/electrical conversion as well as management by allocation of wavelengths and distribution of data streams (F1, F2).

4. The management method as claimed in claim 1, wherein the step of allocating the wavelengths is performed as a function of the positioning of the recipient cabin devices (E1 to E4), a physical constraint of the cabin (100), and of a functional service characteristics related to the distributing data streams (F1, F2) pertaining to a level of class and/or of a security.

5. The management method as claimed in claim 1, wherein the standardized architecture (10*a* to 10*f*) is reconfigured by a digital processing applied to the concentration and the configuration box (11) during installation and/or removal of the audiovisual system (E1), the communication for personal electronic devices system (E2), the non-critical technical communication device system (E3), and/or devices for technical command/control (E4).

6. The management method as claimed in claim 1, further including a redundancy architecture incorporating at least the concentration and configuration interface is deployed according to a configuration identical to the concentration and configuration box (11) of the standardized architecture (10a to 10f).

7. The management method as claimed in claim 1, wherein the optical distribution network (20 to 22) adds separate optical streams (F1, F2) by multiplexing and/or demultiplexing of wavelengths within the network (20 to 22).

8. The management method as claimed in claim 1, wherein the transmission of data is performed in the downgoing and upgoing directions, either on a same optical pathway (2, 3) or on two distinct optical pathways (2a, 2'a; 2b).

9. A data management structure (1a to 1f) embedded on board a transport device incorporating a cabin (100) equipped with passenger seats (110), said structure comprising:
a data resources block (210) incorporating central units (211 to 213) including an audiovisual transmission system, systems for outward communication from the cabin (100), and/or cabin systems,
a standardized architecture for distributing data streams (10a to 10f) in the cabin (100) via a device for converting non-optical signal into optical signals, and
cabin devices (E1 to E4) for utilization of said systems,
wherein said standardized architecture (10a to 10f) comprises a concentration and configuration box (11) for bidirectional transfer including a first transferring direction of non-optical signals with the data resources block (210) and a second transferring direction of optical signals with the cabin devices (E1 to E4) on at least one optical network fiber (2, 3; 2a, 2'a; 2b),
wherein the concentration and configuration box (11) incorporates units (211 to 213) for processing by switching of the non-optical signals, bidirectional conversion of the non-optical signals into optical signals for transfer to the cabin devices (E1 to E4), and management of the optical signals by allocation of wavelengths and distribution of a downgoing optical stream (F1) and an upgoing (F2) optical stream by parametrization of priorities as a function of the cabin devices (E1 to E4) and/or central units (211 to 213), and the concentration and configuration box (11) is linked to the cabin devices (E1 to E4) via intermediate boxes (30, 40), also at least one management unit (111 to 113);
wherein cabin devices (E1 to E4) include an audiovisual system (E1), a communication for personal electronic devices system (E2), a non-critical technical communication device system (E3), and a technical command/control communication system (E4).

10. The management structure as claimed in claim 9, wherein the non-optical signals between the concentration and configuration box (11) and the data resources block (210) are chosen from between electrical, RF, or optical signals.

11. The management structure as claimed in claim 9, wherein the intermediate boxes includes at least one disconnection box (30), each one of the disconnection box (30) including an optical/electrical bidirectional conversion unit (112), a switching unit (111); and the management unit (113).

12. The management structure as claimed in claim 11, wherein each disconnection box (30) is linked to the audiovisual system (E1) and the communication for personal electronic devices system (E2) in proximity to the passenger seats (110) via interface boxes (40) furnished with the processing optical/electrical signals unit (112) and the management unit (113) for optical/electrical conversion and for management by allocation of wavelengths.

13. The management structure as claimed in claim 9, wherein the non-optical signals are electrical signals, and wherein the intermediate boxes include interface boxes (40) having optical/electrical signal unit (112) and a management unit (113), each interface box (40) being linked to devices (E1, E2) in proximity to the passenger seats (110).

14. The management structure as claimed in claim 9, wherein the seats (110) are hooked up to the corresponding intermediate box (40) by signals emitters/receivers.

15. The management structure as claimed in claim 13, wherein the interface boxes (40) are linked, to one another, and to a disconnection box (30) linked to the audiovisual transmission systems and to the communication systems, according to a configuration chosen from between a chain configuration (B2), a bus configuration, a ring configuration, and a star configuration.

16. The management structure as claimed in claim 15, wherein the distributing of the signals by the disconnection box (30) to the interface boxes (40) is carried out by a technique chosen from between copy-overs by successive transfer in the case of a chain configuration (B2) and selective transmissions by optical separators in the case of a star configuration.

17. The management structure as claimed in claim 13, wherein each interface box (40) transmits electrical signals to several passenger seats (110) and comprises a unit (112) for converting a downgoing optical stream (F1) to the systems (E1, E2) into electrical signals and the upgoing optical stream (F1) from the devices (E1, E2) into optical signals, and a unit for management by allocation of wavelengths (113) incorporating an optical add and drop multiplexer (OADM) for injecting and recovering optical signals respectively into and from at least one optical fiber (3; 2'a, 2b).

18. The management structure as claimed in claim 17, wherein the management unit (113) includes a reconfigurable optical add and drop multiplexer (ROADM) for injecting and extracting optical signals.

19. The management structure as claimed in claim 13, wherein the wavelength allocations are parametrized according to a distribution chosen:
by type of system,
by association with a disconnection box (30),
by association with the interface boxes (40) linked to a same disconnection box (30),
by location of the devices (E1, E2), and/or
by type of the downgoing optical stream (F1) and the upgoing optical stream (F2) between the interface boxes (40) and the concentration and configuration box (11).

20. The management structure as claimed in claim 13, wherein the allocation of the wavelengths is identical in the upgoing optical stream and the downgoing optical stream between the interface boxes (40) and the concentration and configuration box (11).

21. The management structure as claimed in claim 13, wherein the intermediate boxes includes at least one disconnection box (30) incorporating units for switching (111) and for management unit (113) as a function of the cabin devices (E1 to E4), each disconnection box (30) being coupled directly to the non-critical technical communication device system (E3) and to the technical command/control communication system (E4), and coupled to the audiovisual system (E1) and to the communication for personal electronic devices system (E2) via the interface boxes (40) furnished with the incorporating units for optical/electrical conversion (112) and the management unit (113) by the allocation of the wavelengths.

22. The management structure as claimed in claim 13, wherein when the allocation of the wavelengths is independent of the interface boxes (40), a device for controlling access to the boxes (40) is provided, the device for controlling access to boxes (40) is chosen from a time division multiplexing (TDM), a token passing, and a synchronous sampling of polling type.

23. The management structure as claimed in claim 9, wherein each one of the processing units (111) comprises resources data switches activated by the concentration and configuration box (11) as a function of the cabin devices (E1 to E4).

24. The management structure as claimed in claim 9, wherein each one of the processing units (111) incorporates a device for managing priorities.

25. The management structure as claimed in claim 11, wherein each one of the processing optical/electrical signals unit (112) incorporates electro-optical emitters-receivers termed transceivers, the transceivers are coupled to specific adaptors of data as a function of the resources (211 to 213).

26. The management structure as claimed in claim 9, wherein each management unit (113) comprises a network for allotting by multiplexing chosen from between a wavelength division multiplexer (WDM), a dense division multiplexer (DWDM), a coarse division multiplexer (CWDM), and an ultra-dense division multiplexer (UDWDM).

27. The management structure as claimed in claim 9, wherein each management unit (113) includes a device for specific management of the optical signals coupled to an optical terminal multiplexer (OTM) and chosen from a terminal multiplexer of wavelengths of the optical signals, an optical wavelength demultiplexer (OWD) of signals arising from the optical network, an optical add drop multiplexer (OADM), a drop multiplexer (OADM), or an optical cross connector of wavelengths to specific ports (OXC).

28. The management structure as claimed in claim 9, wherein the downgoing (F1) and upgoing (F2) optical streams are either carried jointly on at least one optical fiber (2, 3) or separated on at least two optical fibers (2a, 2'a; 2b), the optical fibers being single-mode and/or multimode.

29. The management structure as claimed in claim 9, wherein the transport device is an aircraft and the central units (211 to 213) are situated in the aircraft in proximity to the passenger cabin (100) by an avionics bay (200).

\* \* \* \* \*